United States Patent [19]

Neiger et al.

[11] Patent Number: 5,789,894
[45] Date of Patent: Aug. 4, 1998

[54] SOLID STATE MOTOR SPEED CONTROL

[75] Inventors: Benjamin Neiger, Floral Park, N.Y.; Douglas R. Watson, Stamford, Conn.; Roger Bradley, Bellmore; Saul Rosenbaum, East Meadow, both of N.Y.

[73] Assignee: Leviton Manufacturing Co., Inc., Little Neck, N.Y.

[21] Appl. No.: 832,247

[22] Filed: Apr. 3, 1997

Related U.S. Application Data

[63] Continuation of Ser. No. 435,001, May 4, 1995, which is a continuation of Ser. No. 183,460, Jan. 18, 1994.

[51] Int. Cl.$^6$ ............................................. A02P 1/26
[52] U.S. Cl. ........................ 318/781; 318/107; 318/811
[58] Field of Search ................................ 318/798–815, 318/778–787, 105–107

[56] References Cited

U.S. PATENT DOCUMENTS

| | | | |
|---|---|---|---|
| 3,569,805 | 3/1971 | Hammond | 318/227 |
| 4,616,305 | 10/1986 | Damiano et al. | 363/132 |
| 4,673,851 | 6/1987 | Disser | 318/341 |
| 5,684,376 | 11/1997 | Neiger et al. | 318/781 |

*Primary Examiner*—David S. Martin
*Attorney, Agent, or Firm*—Paul J. Sutton

[57] ABSTRACT

A solid state motor speed control is described that is capable of controlling a motor so that it operates quietly, eliminating annoying buzzing noises that would otherwise be generated by the motor's windings. The invention provides for motor speed control with infinitely variable speed control settings. Rather than use triacs that generate RFI noise and cause motor windings to buzz due to their inherent avalanche switching, the invention utilizes power FETs or IGBTs to provide the switching function to control power delivery to the motor load. The power switches are controlled by an oscillator that generates a pulse train with a duty cycle controllable by the user. A filter shapes this signal into a trapezoidal control signal that drives the gate input of the power FET or IGBT switch. A kick start circuit turns the motor on initially for two to three seconds to overcome the inertia of the motor and its load. A zero crossing detector prevents the motor from being turned on except at a zero crossing of the AC source to further reduce noise.

4 Claims, 3 Drawing Sheets

SOLID STATE MOTOR SPEED CONTROL

This is a continuation of application Ser. No. 08/435,001 filed on May 4, 1995, which itself is a continuation of U.S. patent application Ser. No. 08/183,460, filed Jan. 18, 1994.

BACKGROUND OF THE INVENTION

In practice today there are basically two ways to control the speed of an AC motor. The first way is to reduce the amplitude of the AC voltage reaching the motor. The lower the amplitude of the AC voltage, the slower the motor runs. The amplitude can be reduced by placing a resistor in series with the motor and the AC line. The problem with this method is that the series resistor dissipates large amounts of power as heat. Instead, tapped auto-transformers, tapped motor windings or series capacitors are used. However, it is impossible to create infinitely variable versions of this type of motor speed control. The difficulty and expense involved prevent the manufacture of auto-transformers or tapped motor windings with a large number of taps. Instead, most of these types of motor speed controls come with a small number of fixed factory preset taps or steps. Thus, a user is limited to typically two or three speeds only i.e. low-high or low-medium-high.

The second way to control the speed of an AC motor is to switch the AC to the motor on and off so that the voltage applied across it is chopped. The more voltage chopped out of the AC line, the slower the motor runs. To achieve infinitely variable motor speed control, the majority of today's controls employ a phase shifted triac type of design. These controls work by varying the amount of time the AC is applied to the motor during each half cycle. A solid state switch built around a triac device is typically connected in series with the motor being controlled. At the beginning of each half cycle the triac is off or open. If the triac is turned on at a high phase angle or late in the AC cycle then the motor will be powered for a short time. Conversely, if the triac is turned on early in the cycle or at a low phase angle then the motor will be powered for most of the time and turn very fast. The voltage applied to the motor is a phase shifted chopped sine wave.

The problem with using a triac device as a motor speed control is that it only has two states, on and off. Triacs exhibit switching times measured in nanoseconds causing huge inrush currents to flow through the motor. These inrush currents cause the motor windings and the metal laminations adjacent to them to contract and expand, producing a relatively loud audible noise. The noise is loudest at half speed when the triac turns on at a phase angle of 90°. At this point, the AC to the motor switches from zero to maximum voltage. An unpleasant buzzing noise is emitted with a large harmonic content of 120 Hz since the triac switches during every half cycle of the 60 Hz AC source. If the applications utilizing a triac switch are noisy to begin with, i.e. hand drills, food processors, etc., the loud buzzing noise is tolerated or drowned out by the motor itself. However, there are applications where quiet operation is essential such as in the control of ceiling fans. Most users of ceiling fans would find the 120 Hz buzzing of the motor windings unpleasant and annoying.

In addition to their noise problem, another drawback of using triacs for switching control of fan motors is the large amount of Radio Frequency Interference (RFI) they generate. A triac, with its very fast switching times, generates RFI because its switching waveform resembles an ideal step function in time when it is turned on and off. The ideal frequency response of this step function includes components from the entire frequency spectrum. Thus, triacs emit RFI over a wide frequency spectrum.

Other problems associated with conventional motor speed controls are that they take up much space and dissipate large amounts of heat. Especially large amounts of heat are dissipated in designs utilizing a resistor placed in series with the motor.

Therefore there is a long felt need for a solid state motor speed control that is capable of infinitely variable speed control that produces a minimum of audible noise and RFI. In addition, it should be small enough to fit in a standard wall box receptacle and dissipate a negligible amount of heat. To achieve these goals a different type of solid state switch is utilized. Instead of a triac, with its drawback of avalanche switching, power Field Effect Transistors (FET) or Insulated Gate Bipolar Transistors (IGBT) are used which exhibit linear rather than avalanche switching. Power FETs and IGBTs are voltage controlled impedances whereas triacs are current controlled switches. By applying a suitable control signal to a power FET or IGBT, such as a trapezoidal shaped voltage signal, the motor can be made to turn on and off slowly thereby limiting the high inrush currents which causes the loud annoying buzzing associated with designs incorporating triacs.

A ceiling fan motor speed control circuit utilizing IGBTs has been shown to achieve its highest power efficiency and smoothest fan rotation when the motor is switched on and off with a period of 0.1 to 10 seconds. This relatively low switching frequency is not noticeable to the user because of the large amount of momentum inherent in ceiling fans while they are spinning. It is this inertia or resistance to acceleration that masks the on and off switching of the motor to the user.

SUMMARY OF THE INVENTION

A primary object of the present invention is to provide a motor speed control such that the motor operates quietly and a user is not subjected to an annoying buzzing noise.

Another object of the present invention is to provide for infinite variability of motor speed control settings so that any desired setting from minimum to maximum speed is obtainable.

Yet another objective of the present invention is to minimize both the amount of RFI generated and the heat dissipated when compared with conventional motor controls.

Another objective of the present invention is that it be constructed with solid state components and small enough to fit in a standard wall box receptacle.

Yet another objective of the present invention is that it be a two terminal device operating from one side of the AC source only and connected serially between one side of the AC source and the motor load.

These objectives are achieved by the present invention which may be broadly characterized as a motor speed control comprising switching means for providing continuous linear variation of the flow of electrical current through a load and speed control means electrically connected to the switching means for generating a control signal to turn the switching means on and off repeatedly, determining the amount of electrical current that flows through the switching means.

BRIEF DESCRIPTION OF THE DRAWINGS

Serving to illustrate exemplary embodiments of the invention are the drawings of which.

DETAILED DESCRIPTION OF THE INVENTION

In order to afford a complete understanding of the invention and an appreciation of its advantages, a description of a preferred embodiment of the present invention in a typical operating environment is presented below.

Figure 1:
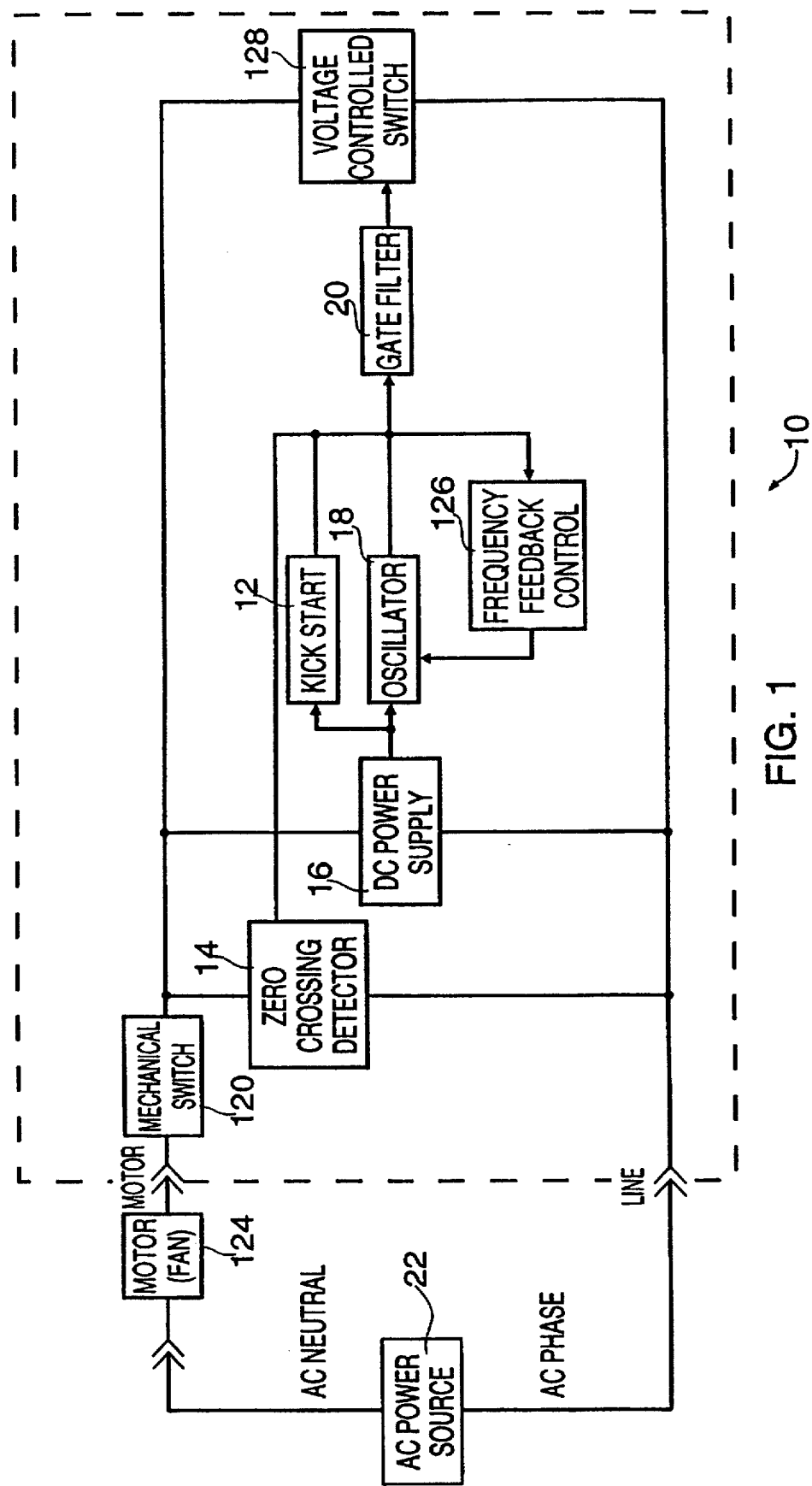
FIG. 1 is a functional block diagram of the preferred embodiment of the present invention.

Shown in FIG. 1 is a functional block diagram of the quiet solid state motor speed controller 10. The motor speed controller 10 is a two terminal device that is normally placed in series with a load, typically being a ceiling fan incorporating a motor 124. The hot phase side of the AC source 22 is connected directly to the LINE terminal of the motor speed controller 10. The MOTOR terminal is connected to one side of the motor 124 and the AC neutral is connected to the other side of the motor 124. A mechanical switch 120 turns power on and off to the motor speed controller 10. An oscillator 18 provides the timing and control signals that ultimately turn the voltage controlled switch 128 on and off. The voltage controlled switch 128 allows current to flow through the motor 124 when it receives a control signal from the gate filter 20 telling it to turn on. A frequency feedback control circuit 126 adjusts the signal from the oscillator 18 so as to keep the fan motor 124 running smoothly and quietly. A kick start circuit 12 provides the motor 124 with increased power during the initial two to three seconds of operation to overcome the relatively large inertia of the motor 124 and the mechanical load attached to it. The gate filter 20 shapes the oscillator 18 signal in a such a way as to reduce motor noise. A DC power supply 16 provides DC voltage to the circuitry of the controller 10. A zero crossing detector 14 prevents the oscillator 18 from turning on the voltage controlled switch 128 at a time other than at the point of a zero crossing of the AC cycle.

Figure 2:
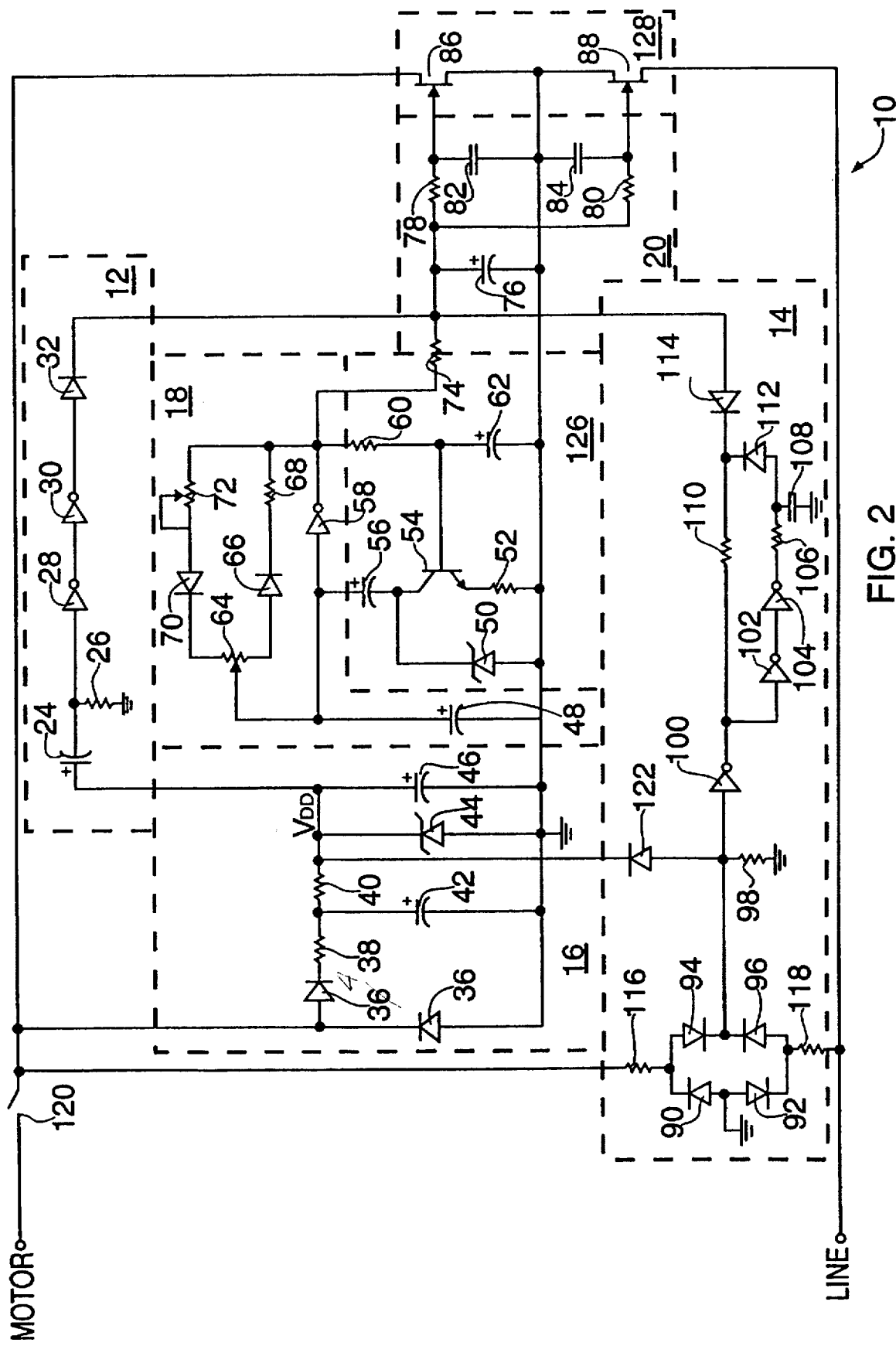
FIG. 2 is a detailed schematic diagram of the preferred embodiment of the present invention.

In FIG. 2 is shown a detailed schematic diagram depicting the motor speed controller 10 circuitry. The DC power supply 16 includes diodes 37, 36 to provide half wave rectification of the AC power source 22. This rectified voltage charges capacitor 42 through resistor 38. A relatively high DC voltage of 100 V develops across storage capacitor 42. The high DC voltage charges capacitor 46, a large storage capacitor, through resistor 40 and clamped by zener diode 44 to a voltage $V_{DD}$ of approximately 12 V. Voltage $V_{DD}$ is the voltage provided to power the controller 10 low voltage circuitry. The power supply 16 consists of two stages rather than one to be able to provide power to the controller 10 when the motor 124 is running within a few percent of its maximum speed. At any speed, when the motor 124 is on, the voltage controlled switch 128 opens and closes every AC half cycle. When the motor 124 is set to run at maximum speed, the voltage controlled switch 128 is closed for most of the cycle, therefore there is a limited amount of time available for charging capacitor 42. The power supply 16 has the burden of providing power to the controller 10 circuitry during the time the voltage controlled switch 128 is closed. Therefore, the storage capacitors 42, 46 must be sufficiently large to hold adequate charge when the switch 128 is closed. During the time switch 128 is closed, capacitor 42 discharges through resistor 40 and charges capacitor 46. This prevents the output supply voltage $V_{DD}$ from dropping when the duty cycle of the motor is high. In addition, the small RC time constant of resistor 38 and capacitor 42 allows very quick charging of capacitor 42 during the short time the switch 128 is open.

The oscillator 18 is built around a Schmitt inverter 58 with a feedback network consisting of capacitor 48, variable resistors 64, 72, diodes 70, 66 and resistor 68. When the output of the inverter 58 is high, capacitor 48 charges through variable resistor 72 ($R_{72}$), diode 70 and the portion of variable resistor 64 between the common terminal and diode 70 ($R_{64A}$). Charging continues until the voltage across capacitor 48, which also is input to the inverter, reaches the threshold voltage $V_{T+}$ causing the inverter 58 to switch to the low state. The time the inverter 58 output is high can be expressed as $$t_{on} = (R_{72} + R_{64A})C_{48} \ln\left(\frac{V_{DD} - V_{T-}}{V_{DD} - V_{T+}}\right)$$

Input voltage $V_{T-}$ is the threshold voltage below which the inverter switches to the high state. When the inverter 58 output switches low, capacitor 48 discharges through resistor 68 ($R_{68}$) and the portion of variable resistor 64 between the common terminal and diode 66 ($R_{64B}$). Discharging continues until the voltage across capacitor 48 falls below $V_{T-}$ which causes the inverter 58 output to switch to the high state. The time the inverter 58 output is low can be expressed as $$t_{off} = (R_{68} + R_{64B})C_{48} \ln\left(\frac{V_{T+}}{V_{T-}}\right)$$

The time of one complete cycle is given by $$t_{on} + t_{off} = \frac{1}{\text{frequency}} = \text{time of one cycle}$$

and $$R_{64A} + R_{64B} = R_{64} = \text{total resistance of variable resistor 64}$$

The time for one cycle can then be expressed as $$\frac{1}{\text{frequency}} = (R_{68} + R_{72} + R_{64})C_{48} \ln\left[\left(\frac{V_{DD} - V_{T-}}{V_{DD} - V_{T+}}\right)\left(\frac{V_{T+}}{V_{T-}}\right)\right]$$

The equations presented above for $t_{on}$, $t_{off}$ and the inverse of frequency are only approximate due to the voltage drops across diodes 70, 66 while capacitor 48 is charging and discharging.

Variable resistor 64 provides infinitely variable adjustment of the inverter 58 output duty cycle without needing to change the frequency of the oscillator. Low RPM variable resistor 72 provides adjustment for the minimum $t_{on}$ which determines the minimum speed of the motor 124. Different motors might require different minimum speed settings. User control of the motor 124 speed is infinitely variable, from the lowest power, slowest speed to the highest power, fastest speed.

The gate filter 20 filters the oscillator 18 output control voltage signal and applies it to the voltage controlled switch 128. Components of the gate filter 20 include resistors 74, 78, 80 and capacitors 76, 82, 84. The pulse output of the oscillator 18 is shaped by the low pass RC network of resistor 74 and capacitor 76. A trapezoidal shaped voltage waveform develops across capacitor 76 as it charges and discharges through resistor 74. The output voltage of this RC network drives the control inputs of the voltage controlled switch 128. Resistors 78, 80 are necessary to prevent parasitic oscillations or chatter within the voltage controlled switch 128. Capacitors 82, 84 are optional being connected to the control inputs of the switching devices in the voltage controlled switch 128. These capacitors can be used to further define the shape of the signal applied to the control inputs of the switch 128.

The voltage controlled switch 128 consists of two solid state switches 86, 88. Any type solid state switch with a linear switching region is suitable such as Junction Field Effect Transistors (JFET), Insulated Gate Bipolar Transistors (IGBT) or Darlington transistors. Triacs, however, are not suitable because they only have two states, on and off. With switching times measured in nanoseconds, triacs cause undesirable high inrush currents to the motor 124, causing excessive noise to be generated in the motor's windings. Linear sold state switches do not employ avalanche switching and therefore do not create motor noise. The switches may be used individually with a bridge providing DC voltage across them or in pairs in a totem pole arrangement. In the preferred embodiment the switch 128 consists of two FETs 86, 88 connected source to source in series with the motor 124 being controlled. Two FETs are required because each FET can only switch power in one direction. Inherent in the physics of any power FET device is a reverse diode that allows current to flow through the device when a FET is reverse biased. During the positive half cycle of the AC power source 22, switch 86 is on but switch 88 conducts through its reverse diode even though it is off. Conversely, during the negative half cycle of the AC source 22, switch 86 conducts through its reverse diode and switch 88 is on.

The connection of the sources of the two switches 86, 88 creates a floating ground between them. This floating ground becomes a reference for the DC power supply 16 and the gate voltages of the FET switches 86, 88. The floating ground permits both FETs 86, 88 to be turned on and off simultaneously by a single drive control signal. Thus, control of the FETs 86, 88 is independent of the momentary phase angle of the AC source 22. This is not true, however, in the control of triacs.

The kick start circuit 12 provides a solution to the problem that exists when the motor 124 is initially turned on and set at a very low speed. In this case, the motor 124 might not receive enough current to overcome the inertia of the motor's 124 rotor and the mechanical load attached to it such as the blade assembly of a ceiling fan. By forcing the motor 124 to run at full speed for 2 to 3 seconds this problem is overcome and a positive start is assured. When power is first applied to the controller 10, voltage $V_{DD}$ appears across capacitor 24. The output of inverter 28 is low and the output of inverter 30 is high. Diode 32 is forward biased and provides a positive voltage across capacitor 76. This causes the voltage controlled switch 128 to turn on at full power. Capacitor 24 slowly charges up, reducing the voltage across resistor 26 until, after about 2 to 3 seconds, it falls to a point where it causes the output of inverter 28 to be switched high. This causes inverter 30 to switch low removing any positive voltage across capacitor 76 thereby turning off the motor 124. Diode 32 decouples the kick start circuit 12 from the oscillator circuit 18 so it no longer has any effect on the solid state switch after the inverter 30 switches low.

As previously described, motor 124 speed is controlled by changing the duty cycle of the oscillator 18 signal. At high motor 124 speeds, the relatively low frequency oscillator 18 signal is adequate to control fan speed with imperceptible motor jerkiness. However, at low speeds the low frequency oscillator 18 signal causes the motion of the fan to become noticeably jerky. To solve this problem, the frequency feedback control circuit 126 increases the oscillator 18 frequency at low fan speeds. This removes any jerkiness in the fan rotation. Lowering the oscillator 18 frequency only during high fan speeds also serves to achieve greater power efficiency since the heat dissipation of the controller 10 is directly proportional to frequency.

The frequency feedback control circuit 126 consists of resistors 60, 52, capacitors 62, 56 zener, diode 50 and Darlington transistor 54. Inverter 58 charges capacitor 62 through resistor 60 when its output is high. When the duty cycle is low, the charge developed across capacitor 62 through resistor 60 is insufficient to turn on transistor 54. At this point, capacitor 56 is not a part of the oscillator 18 circuit and the oscillator 18 is forced to oscillate at a higher frequency, eliminating perceptible jerky fan motion. However, at high duty cycles, the output of inverter 58 is able to charge capacitor 62 through resistor 60 sufficiently high enough to turn on and saturate transistor 54. Current flows through capacitor 56 which is switched into the oscillator 18 circuit. The addition of this parallel capacitor 56 to the oscillator 18 circuit causes the oscillator 18 to oscillate at a lower frequency when the duty cycle is high (i.e. fast motor 124 speeds) thereby decreasing controller 10 power dissipation. Resistor 52 slows down the charging and discharging of capacitor 56 providing a gradual change in frequency from slow to fast motor 124 speeds. Diode 50 prevents capacitor 56 from driving the collector of the transistor 54 negative with respect to ground, limiting the lowering of the oscillator 18 frequency at high fan speeds.

To assure quiet motor 124 operation and to eliminate the generation of RFI, a zero crossing detector 14 prevents the motor 124 from being switched on at any time in the AC cycle other than at the zero crossing. Diodes 90, 92, 94, 96 form a full wave bridge rectifier between the MOTOR and LINE terminals. Resistors 116, 118 limit the current through the bridge and in the event diodes 90, 92, 94, 96 fail, limit the current that can flow between the MOTOR and LINE terminals. The voltage across load resistor 98 is clamped to approximately voltage $V_{DD}$ by diode 122. The waveform across load resistor 98 is the unfiltered AC source 22 with a peak of approximately $V_{DD}$ referenced to the floating ground. This waveform is input to the Schmitt inverter 100 which outputs a steady low with the exception of short $V_{DD}$ pulses at each zero crossing of the AC source 22. The inverter 100 output is applied to the gate filter 20 and voltage controlled switch 128 through resistor 110 and diode 114. Diode 114 decouples the zero crossing detector 14 from the gate filter 20 when the voltage across capacitor 76 is low.

When the output of the oscillator switches high and the output of the inverter 100 is low, the voltage divider formed by resistors 74, 110 prevent capacitor 76 from charging to a high enough voltage to turn on the voltage controlled switch 128. When the output of the inverter 100 switches high, capacitor 76 can charge through resistor 74 as normal. The switch 128 closes and the motor 124 is turned on. Thus, turn on of the fan is delayed until the zero crossing of the AC voltage. This makes the linear switching portion of FETs 86, 88 less critical, provides for quiet motor control and lowers controller 10 power dissipation.

During the time the switch 128 is closed, the voltage between the MOTOR and LINE terminals drops to zero eliminating the generation of zero crossing pulses. However the control circuitry is still powered from storage capacitor 46. Eventually the oscillator 18 switches low and capacitor 76 starts discharging and the voltage controlled switch 128 starts to open. The voltage between the MOTOR and LINE terminals rises and the output of inverter 100 switches low. To prevent noisy fan motor operation caused by capacitor 76 discharging too quickly, the zero crossing detector 14 operation is modified during the time the motor 124 is being switched off. While the motor 124 is on, the output of inverter 100 is high. Inverters 102, 104 charge capacitor 108 through resistor 106 and diode 112 is reverse biased. When the output of inverter 100 switches low again, the charge on capacitor 108 is added to the charge flowing from capacitor 76 through resistor 106. The discharge of capacitor 76 is thereby slowed, preventing noisy fan motor operation. When the voltage across capacitor 108 falls to a low enough level it is decoupled from the circuit by diode 112.

Figure 3:
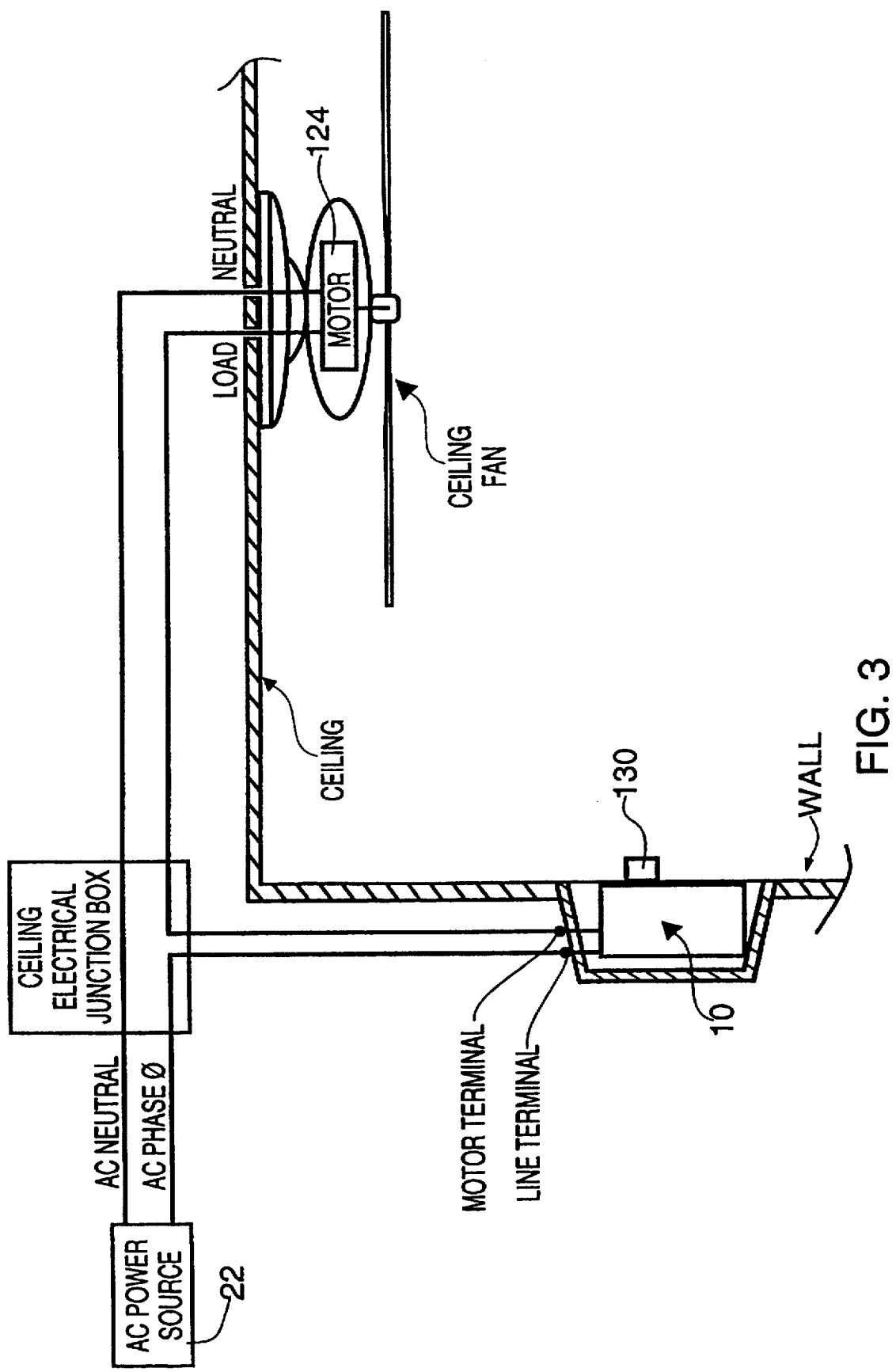
FIG. 3 is a wiring diagram showing the typical wiring configuration of the present invention.

Shown in FIG. 3 is the wiring scheme for a typical application of the motor speed controller 10 connected to the AC source 22 and a ceiling fan incorporating a motor 124. The controller 10 is a two terminal device and connects to only one side of the AC source 22 in series with the ceiling fan load. A user control knob 130 is connected internally to the mechanical switch 120 and variable resistor 64. Thus, the user can control both on/off operation and motor speed adjustment using control knob 130.

It is clear that the above description of the preferred embodiment in no way limits the scope of the present invention which is defined by the following claims.

What is claimed is:

1. A motor speed control system comprising an AC source, a ceiling fan motor electrically connected to a neutral terminal of said AC source and a motor speed controller, said motor speed controller comprising:

solid state switching means including at lease one FET electrically connected between said ceiling fan motor and a phase terminal of said AC source for providing substantially continuous, substantially linear variation of a flow of electrical current from said AC source through said ceiling fan motor in proportion to a control signal applied to said switching means;

a mechanical switch in said motor speed controller coupled to said ceiling fan motor and said solid state switching means to interrupt or establish the path between said ceiling fan motor and said solid state switching means;

low pass filter means electrically connected to said switching means for transferring said control signal thereinto, said low pass filter means removing high frequency signal content from said control signal;

speed control means including oscillator means which is electrically connected to said low pass filter means for generating and supplying said control signal to said switching means via said low pass filter means to turn said switching means on and off repeatedly thereby determining said flow of electrical current and wherein said speed control means turns said switching means on and off such that said current is delivered to said motor at a frequency independent of a frequency of said electrical current;

frequency feed back control means electrically connected to said oscillator means, said feed back control means functioning to increase a frequency generated by said oscillator at low fan motor rotation speeds in order to remove jerkiness in the rotation of said fan motor;

zero crossing detector means electrically connected between said AC source and said ceiling fan motor, said zero crossing detector means also electrically connected to said filter means for preventing said actuation of said switching means during times other than a time substantially concurrent with a zero crossing of an AC signal generated within said AC source;

kick start means electrically connected to said filter means for briefly allowing maximum electrical current to flow through said ceiling fan motor upon initial application of said AC source to said motor speed control system; and a DC power supply connected across said solid state switching means and having an output terminal coupled to said oscillator means and to said kick start means to provide DC voltage to circuitry of said motor speed controller.

2. A motor speed control as recited in claim 1 wherein said speed control means further comprises frequency feedback means for changing the frequency of said oscillator means according to the speed of said ceiling fan.

3. A motor speed control systems comprising:

an AC source;

a ceiling fan motor electrically connected to neutral terminal of said AC source; and a motor speed controller, said motor speed controller comprising:

solid state switching means including at lease one IGBT electrically connected between said ceiling fan motor and a phase terminal of said AC source for providing substantially continuous, substantially linear variation of a flow of electrical current from said AC source through said ceiling fan motor in proportion to a control signal applied to said switching device;

a mechanical switch in said motor speed controller coupled to said ceiling fan motor and said solid state switching means to interrupt or establish the path between said ceiling fan motor and said solid state switching means;

low pass filter means electrically connected to said switching means for removing high frequency signal content from said control signal;

speed control means including oscillator means which is electrically connected to said filter means for generating and supplying said control signal to said switching means via said low pass filter means to turn said switching means on and off repeatedly thereby determining said flow of electrical current, and wherein, said speed control means turns said switching means on and off such that said current is delivered to said motor at a frequency independent of a frequency of said electrical current;

frequency feed back control means electrically connected to said oscillator means, said feed back control means functioning to increase a frequency generated by said oscillator at low fan motor rotation speeds in order to remove jerkiness in the rotation of said fan motor;

zero crossing detector means electrically connected between said AC source and said ceiling fan motor, said zero crossing detector means also connected to said filter means for preventing said activation of said switching means during times other than a time which is substantially coincident with a zero crossing of an AC signal of said AC source;

kick start means electrically connected to said filter means for briefly allowing maximum electrical current to flow through said ceiling fan motor upon initial application of said AC source to said motor speed control system; and a DC power supply connected across said solid state switching means and having an output terminal coupled to said oscillator means and to said kick starting means to provide DC voltage to circuitry of said motor speed controller.

4. A motor speed control as recited in claim 3 wherein said speed control means further comprises frequency feedback means for changing the frequency of said oscillator means according to the speed of said ceiling fan.

* * * * *